United States Patent [19]
Tochino et al.

[11] Patent Number: 5,611,950
[45] Date of Patent: Mar. 18, 1997

[54] ARC WELDING POWER SOURCE

[75] Inventors: Masamitsu Tochino, Kawanishi; Norikazu Osaki, Ikoma-gun, both of Japan

[73] Assignee: Matsushita Electric Industrial Co., Ltd., Osaka, Japan

[21] Appl. No.: 549,236

[22] Filed: Oct. 27, 1995

[30] Foreign Application Priority Data

Oct. 27, 1994 [JP] Japan .................................. 6-263005

[51] Int. Cl.⁶ ...................................................... B23K 9/10
[52] U.S. Cl. ............................................................ 219/130.1
[58] Field of Search ........................... 219/130.1, 130.51, 219/130.31, 130.32, 130.33, 137 PS

[56] References Cited

U.S. PATENT DOCUMENTS

| | | | |
|---|---|---|---|
| 3,337,769 | 8/1967 | Buchanan | 219/130.33 |
| 3,339,107 | 8/1967 | Aldenhoff | 219/130.51 |
| 3,345,552 | 10/1967 | Aldenhoff | 219/130.1 |
| 3,665,149 | 5/1972 | Sakabe et al. | 219/130.51 |
| 3,984,654 | 10/1976 | Hoffman et al. | 219/130.32 |
| 4,071,885 | 1/1978 | Bilczo et al. | 219/130.33 |
| 4,392,045 | 7/1983 | Gilliland | 219/130.1 |

FOREIGN PATENT DOCUMENTS 3-253262  11/1991  Japan .

*Primary Examiner*—Clifford C. Shaw
*Attorney, Agent, or Firm*—McDermott, Will & Emery

[57] ABSTRACT

An arc welding power source comprises a pair of rectifiers connected in parallel with each of double star connection three phase rectifying circuits and a capacitor connected in parallel with the entire rectifying circuit without a DC reactor. As a result, the arc welding power source can supply stable welding current having a smooth waveform and enough short circuit current.

6 Claims, 4 Drawing Sheets

ARC WELDING POWER SOURCE

FIELD OF THE INVENTION

This invention relates to an arc welding power source comprising double star connection with rectifying circuits.

BACKGROUND OF THE INVENTION

Electric arc welding has been employed in many applications. A task in electric arc welding is stabilizing the waveform of the DC welding current.

What follows is a description of a prior art of arc welding power source. The arc welding power source as referred to here is a power source for consumable electrode arc welding.

A consumable electrode arc welder needs a power source that is capable of supplying a large DC current reaching several hundreds of amperes. In order to obtain such a DC supply, a means to rectify three phases AC source is mainly used; and sometimes several rectifying circuits in parallel are used taking the characteristics of rectifiers into consideration. For example, Japan patent gazette Toku Kai Hei3-253262 (Japanese Unexamined Patent Publication 253262/1991) describes a means in which two outputs of three phase bridge rectifying circuits are connected in parallel, and a smoothing capacitor is connected to the output in order to suppress the ripple. In the circuit, however, a reactor is inserted in series to the three phases AC input to avoid an imbalance in the current value of each rectifying circuit, which not only makes them complicated but also includes two diodes in the channel of DC current. Therefore, the prior art circuit is not suitable for a large current application.

Among the devices connecting two rectifying circuits in parallel is a double star connection with rectifying circuits. The rectifying circuit is composed of a pair of three phase star connections with half-wave rectifying circuits connected in parallel, and has been widely used as a large current power source, including that of the consumable electrode arc welder.

FIG. 5 shows a device having the above-described construction, the operation of which is described below. A three phase AC current applied to a primary coil of a welding transformer 1 makes secondary coils $1a–1c$ of the star connection and secondary coils $1d–1f$ of the star connection generate three phases AC voltage. The AC voltages at the secondary coils $1a–1c$ are rectified in three phase half-wave by control rectifiers (e.g. thyristors) $2a–2c$, respectively, to generate a DC voltage between a neutral point 8 and anodes of the control rectifiers (e.g. thyristors) $2a–2c$. In the same way, the AC voltages at the secondary coils $1d–1f$ are rectified in three phase half-wave by the control rectifiers $2d–2f$, respectively, to generate a DC voltage between the neutral point 8 of the star connection and anodes of control rectifiers $2d–2f$. These DC voltage outputs are applied to an interphase reactor 3, to be led from the middle point 11 of the interphase reactor 3 to the negative side of output terminals 5 through DC reactor 4. The output terminals 5 connect with output cables which are connected with a welding torch or a parent metal.

Moreover, the phase difference between the AC voltage of secondary coils $1a–1c$ and the AC voltage of the secondary coils $1d–1f$ are normally set to be $\pi/3$ to obtain a DC current having smaller ripple equivalent to six phases. As the circuit has only one control rectifier in each of the electricity channels the voltage drop is minimum, and because of the parallel structure of two rectifying circuits this type of structure is widely used as the power source for consumable electrode arc welding which needs a large electric current.

The problem of the prior art arc welding power source is that the inductance of the DC reactor must be large in order to make the ripple in welding current small for a stable welding operation. However, when the inductance value is large a dI/dt value and a short circuit current value during welding, both of which are essential to obtain a good weld, are suppressed by the DC reactor. Furthermore, the waveform of the welding current is directly influenced by the rectified waveform of each of the control rectifiers, as shown in FIG. 6, making it impossible to obtain a stable waveform of a welding current. Furthermore, the short circuit current value that plays an important role in welding is not stable; consequently, the results of welding are not satisfactory.

SUMMARY OF THE INVENTION

An object of this invention is to solve the above mentioned problems, and offer an arc welding power source that provides a stable welding current waveform with a simple circuit construction, in the arc welding power sources using a double star connection control rectifying circuit that are suitable for a low voltage, large current application.

The arc welding power source in accordance with this invention comprises:

a welding transformer having a pair of star connection three phase secondary coils, a first welding output terminal made by connecting each of the neutral points of said pair of star connection three phase secondary coils, a pair of common connecting points, at each of the pair of star connection three phase secondary coils, which connects secondary coils of the star connection three phase secondary coils at the end opposite to the neutral point, control rectifiers connected between the neutral point and the common connecting points in series to each of the secondary coils, an interphase reactor connecting each of the common connecting points, a DC reactor connected to the middle point of the interphase reactor, a second welding output terminal connected to the DC reactor, a capacitor connected at one end to a connecting point between the interphase reactor and the DC reactor, and at the other end to said first welding output terminal, and a pair of rectifiers connected between the neutral point and each of said common connecting points.

The power source in accordance with this invention comprises:

a welding transformer having a pair of star connection three phases secondary coils, a first welding output terminal made by connecting each of the neutral points of the pair of star connection three phase secondary coils, a pair of common connecting points, at each of the pair of star connection three phase secondary coils, which connects secondary coils of the star connection three phase secondary coils at the end opposite to the neutral point, rectifiers connected between the neutral point and the common connecting points in series with each of the secondary coils, an interphase reactor connecting said two common connecting points, a DC reactor connected to the middle point of the interphase reactor, a second welding output terminal connected to the DC reactor, a capacitor connected at one end to a connecting point between said interphase reactor and the DC reactor, and at the other end to the first welding output terminal, a pair of rectifiers connected between the neutral point and each of the common connecting points, and a means to control the welding output.

In another embodiment, the power source is provided with a resistor in parallel with the capacitor. Further, the power source is provided with a switching means in series to the resistor.

As pointed out in greater detail below, in this invention, a capacitor curtails the ripple in welding current to stabilize the waveform of electric current, and the discharge current of the capacitor provides a stable welding current and a short circuit current during welding. Further, two rectifiers connected bypassing the secondary coils of the welding transformer and the control rectifier function as a freewheeling diode pouring the transient current of reactor into the capacitor to regenerate the energy.

The invention itself, together with further objects and attendant advantages, will be best understood by reference to the following detailed description taken in conjunction with the accompanying drawings.

DETAILED DESCRIPTION OF THE INVENTION

Figure 1:
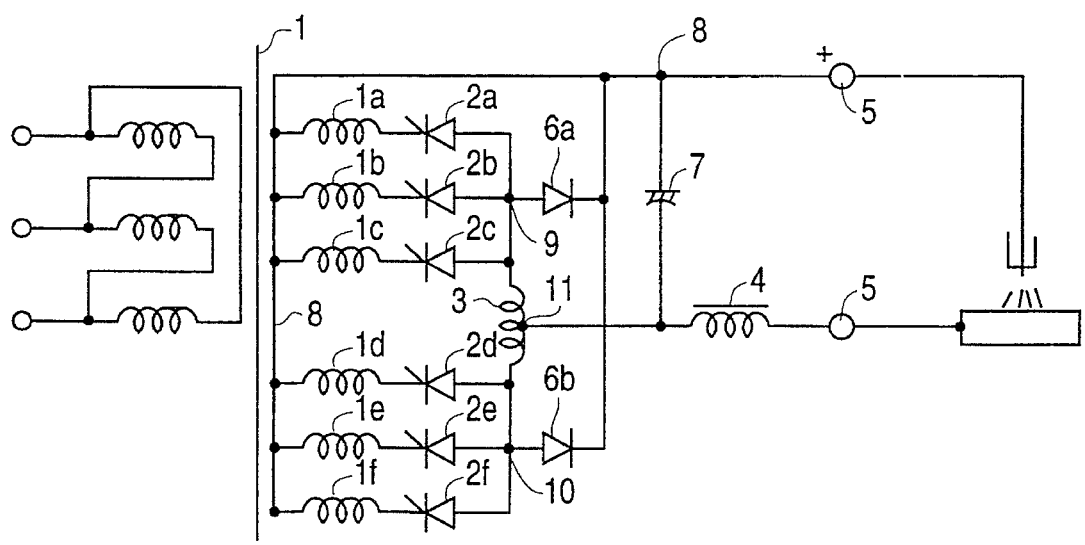
FIG. 1 is a circuit diagram of a first embodiment of an arc welding power source in accordance with this invention.

A first embodiment of an arc welding power source in accordance with this invention is described referring to FIG. 1. Although the embodiment is described with a consumable electrode arc welding power source in mind, it is to be understood that this invention is not to be interpreted as limited to a consumable electrode type of the arc welding power source.

Figure 5:
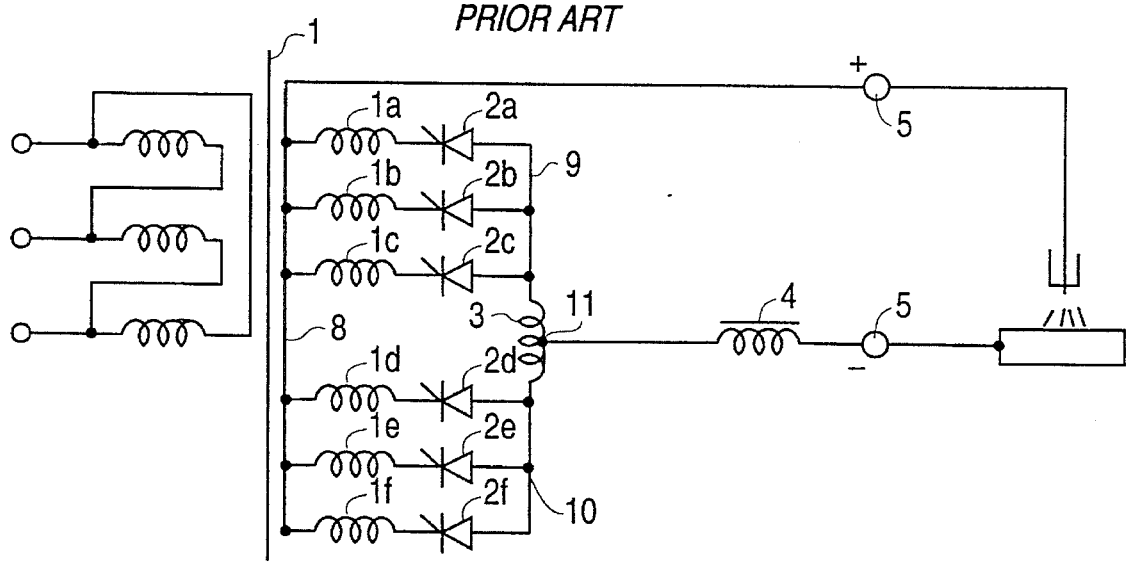
FIG. 5 is a circuit diagram of a prior art arc welding power source.

FIG. 1 is a circuit diagram of an embodiment of an arc welding power source. The constituent parts having the same functions as in a prior art arc welding power source shown in FIG. 5 are given the same numerals, detailed explanations of which are omitted. The arc welding power source of the embodiment of FIG. 1 differs from the prior art arc welding power source shown in FIG. 5 in that a capacitor 7 is provided between the neutral point 8 of the star connection (in this embodiment, the neutral point 8 is the same as the positive output terminal) and a middle point output terminal 11 of the interphase reactor 3, a diode 6a is provided to the secondary coils 1a–1c between the neutral point 8 of the star connection and the common connecting point (rectified output terminal) 9 of the control rectifiers 2a–2c, and a diode 6b is provided to the secondary coils 1d–1f between the neutral point 8 of the star connection and the common connecting point (rectified output terminal) 10 of the control rectifiers 2d–2f.

Figure 2:
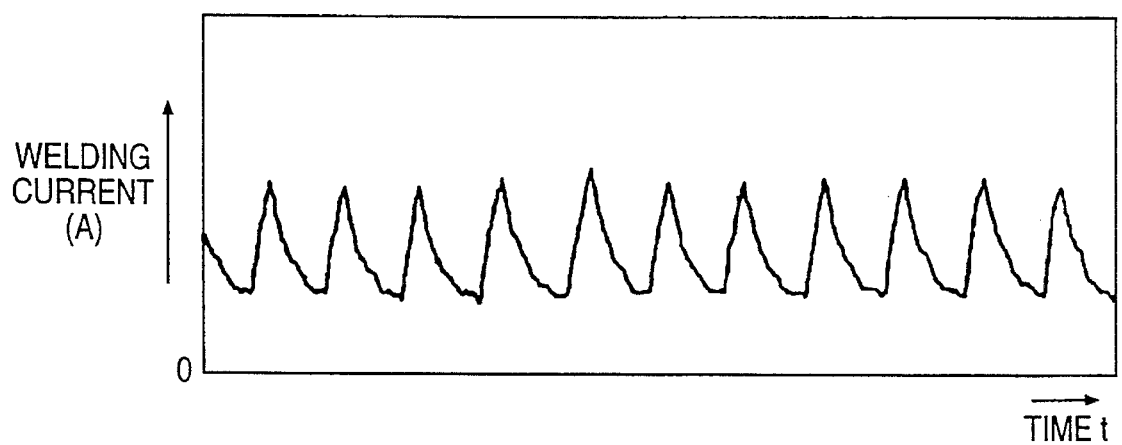
FIG. 2 is a waveform chart of a welding current in the embodiment of FIG. 1.

The operation of the circuit of FIG. 1 is described below. Each of the control rectifiers rectifies the AC voltage of corresponding secondary coil, the influence from each of the rectified electric waveforms is smoothed by the capacitor 7, the regeneration currents from the interphase reactor 3 and DC reactor 4 during the transition period of each control rectifier is charged to the capacitor 7 by freewheeling function of the diode 6a and diode 6b. Thus, the current transition of each control rectifiers is conducted in a stable manner. The electric charge of the capacitor 7 also contributes to the supply of short circuit current during welding. FIG. 2 shows the welding current waveform of a consumable electrode arc welder comprising the power source in accordance with the embodiment of FIG. 1.

Figure 6:
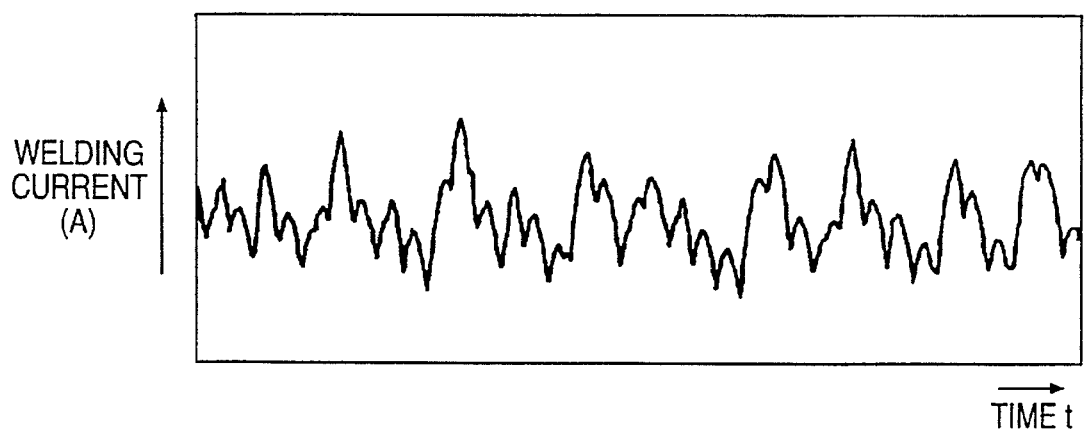
FIG. 6 is a waveform chart of a welding current in the prior art arc welding power source.

When the welding current waveform of the embodiment of FIG. 1 is compared with that of the prior art power source as illustrated in FIG. 6, it is evident that the welding current in the embodiment shown in FIG. 2 has a stable waveform without being influenced by the rectified waveform of each of the rectifiers 1a–1f. In contrast, the waveform of welding current in the prior art is not stable, because the values of rectified currents rectified by each of the control rectifiers is not regular. The welding current waveform of the embodiment of FIG. 1 assures stable and excellent welding. The capacitor 7 improves circuit operation by not only removing the ripple in the welding current, but also by supplying a large pulse welding current and short circuit current during welding. When a high capacitance is required in the capacitor 7, electrolytic capacitors may be used.

Figure 3A:
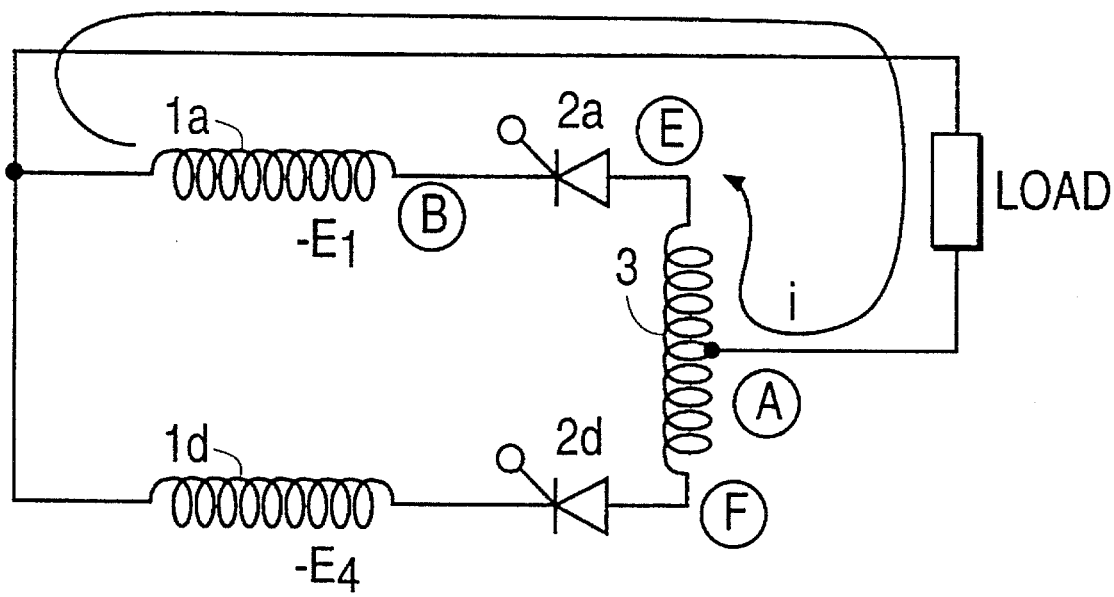
FIG. 3(a) is a simplified circuit diagram of an interphase reactor in the embodiment of FIG. 1.
Figure 3B:
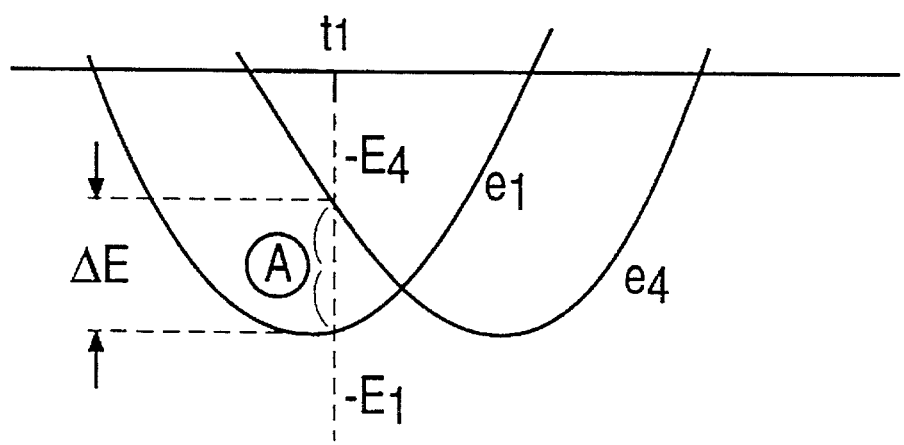
FIG. 3(b) is a chart of the voltage generated in the secondary coils of a welding transformer and an interphase reactor.

FIG. 3(a) shows an interphase reactor in the arc welding power source in accordance with the first embodiment of this invention, and FIG. 3(b) the voltage of the same. Out of the two star connection rectifying circuits one phase each is described because both function in the same manner. Assuming the control rectifier 2a is in an ON state, when the control rectifier 2d is on the point of turning on at t1 the electric potential at point A is equal to the potential at point B if the interphase reactor 3 does not exist. The potentials of point B and point D viewed from point C are -E1 and -E4, respectively, and the control rectifier 2d is reverse-biased by ΔE, therefore the rectifier 2d is unable to turn on at t1. However, when the interphase reactor 3 is provided, an electric current i flows from A to E of the interphase reactor 3 causing a voltage drop of E/2, while inducing a voltage of 2/E between A and F of the interphase reactor 3. As a result, the output voltage of the two rectifying circuits is equal making it possible for the control rectifiers 2a and 2b to be in an ON state simultaneously. Thus, by virtue of the interphase reactor 3, the two rectifying circuits operate smoothly in parallel.

As described above, according to the first embodiment of this invention where the capacitor 7 is provided between the middle point output terminal 11 of the interphase reactor 3 and neutral point 8 of star connection, and bypassing diodes 6a and 6b are connected between the neutral point 8 of star connection and common connecting point 9 and between the neutral point 8 of star connection and common connecting point 10, respectively, a rectified current having a stable waveform is obtainable with a simple construction, and excellent welding is produced.

Figure 7:
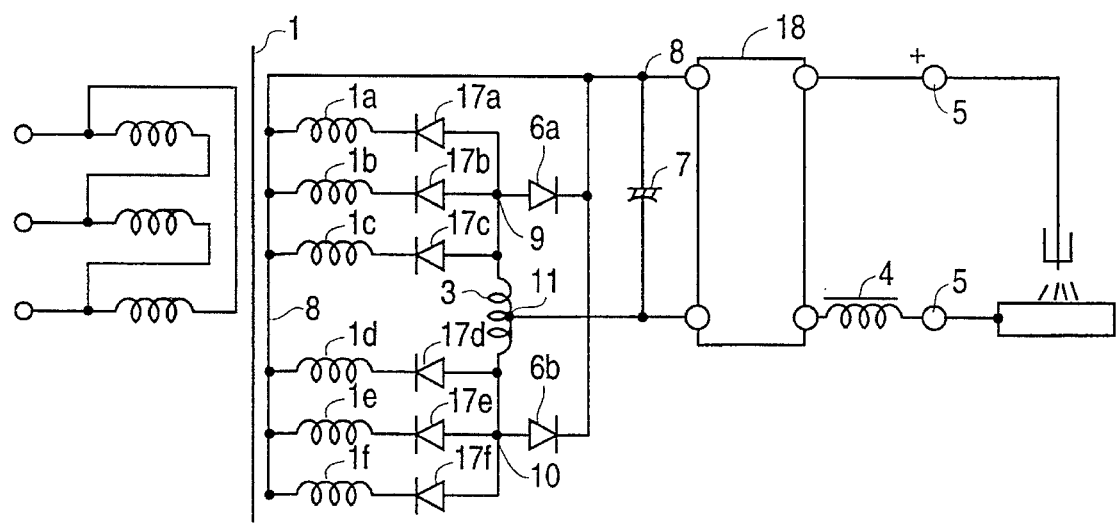
FIG. 7 is a circuit diagram of an alternate embodiment of an arc welding power source in accordance with this invention.

Although in the first embodiment the neutral point of star connection is a positive terminal, it should be understood that the neutral point of star connection may also be a negative terminal to obtain the same results. In addition, although in the first embodiment a control rectifier such as thyristor is connected to each of the secondary coils 1a–1f, it should be understood that a simple rectifier such as diode may be used instead of the control rectifier if an additional means to control welding output is provided in the circuit as shown in FIG. 7.

In FIG. 7, 17a–17f is a simple rectifier, such as a diode, and 18 is a welding output controller. Because 17a–17f is a simple rectifier, it cannot control the welding output, therefore, a welding output controller 18 is necessary. A power transistor circuit is a popular choice for the welding output controller 18, but various circuits known to those skilled in the art can also be used.

Figure 4:
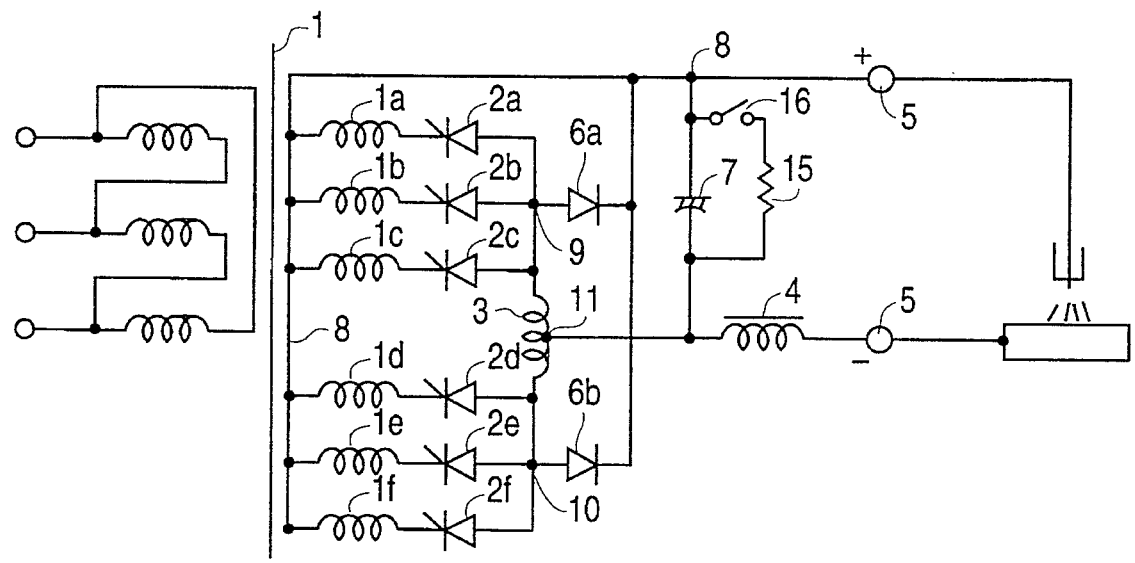
FIG. 4 is a circuit diagram of another embodiment of an arc welding power source in accordance with this invention.

In another embodiment of this invention, as shown in FIG. 4, there is a series circuit consisting of a resistor 15 and a switch 16, provided in parallel with the capacitor 7 in the circuit of the first embodiment. An electrolytic capacitor is used as the capacitor 7. When the welding operation is finished, the switch 16 is turned on automatically or manually by detecting completion of welding.

If a resistor 15 is connected to the capacitor 7 via a switch 16, which is closed only at a time just after welding finishes, the time of discharge current going through the resistor 15 is shortened, which allows using a resistor of smaller electric rating (e.g. a 160 W resistor) as a discharge resistor. In the second embodiment three 27000 μF capacitors connected in parallel have been used as the capacitor 7 providing a capacitance 81000 μF, and four 39Ω resistors connected in parallel as resistor 15 providing a resistance approximately 10Ω.

As a more detailed explanation, according to the International Electrotechnical Commission international industrial standard IEC974-01, "Requirement For Arc Welding Equipment Part 1: Welding Power Source", the arc voltage during welding is represented to be:

$$V=14+0.05I$$

where, the maximum arc voltage V is 44 V (welding current 600 A). When this is converted to the resistance equivalent, the arc resistance during welding, which is between an electrode and a parent metal, turns out to be approximately 0.0073Ω at the largest. The resistor 15 should be such that allows the capacitor 7 to discharge within 1 to 2 seconds, without affecting the arc resistance during welding, which is between an electrode and parent metal.

In the embodiment of FIG. 4, electric charge stored in the capacitor 7 is consumed by the resistor 15 after welding ends. Therefore, even if an operator touches an electrode or a parent metal after welding finishes, the operator does not receive an electric shock from the electric charge stored in the capacitor 7. Thus, the arc welding power source is safer.

Variations on the embodiments described above are possible. For example, when the capacitance of the capacitor 7 is e.g. 90,000 μF, the time constant is 0.9; if in this embodiment the switch 16 is not used, the resistor 15 remains connected between the output circuits, which means that the resistor 15 has to have a rating that can withstand the no-load voltage of the welder. A resistor of high electric rating (for example, a 250 W resistor) has to be selected. It is therefore possible, without the switch 16, to implement an arc welding power source having increased safety by selecting a suitable resistor. However, from the practical point of view, it is effective to install a switch 16, to reduce the size of the arc welding power source.

Furthermore, as described above, by using a switch 16, a resistor of 160 W electric rating endures enough in actual operation even if the output of welding power source is repeatedly opened and closed.

Of course, it should be understood, that a wide range of changes and modifications can be made to the preferred embodiments described above. It is therefore intended that the foregoing detailed description be regarded as illustrative rather than limiting and that it be understood that it is the following claims, including all equivalents, which are intended to define the scope of the invention.

We claim:

1. An arc welding power source comprising:

a welding transformer having a pair of star connection three phase secondary coils, a first welding output terminal made by connecting each neutral point of said pair of star connection three phase secondary coils, a pair of common connecting points, at each of said pair of star connection three phase secondary coils, which connects secondary coils of said star connection three phase secondary coils at an end opposite to said neutral point, a plurality of control rectifiers connected between said neutral point and said common connecting points in series to each of said secondary coils, an interphase reactor connected between said two common connected points, a DC reactor connected to a middle point of said interphase reactor, a second welding output terminal connected to the DC reactor, a capacitor, having two ends, connected at one end to a connecting point between said interphase reactor and said DC reactor and at the other end to said first welding output terminal, and a pair of rectifiers connected between said neutral point and each of said common connecting points.

2. An arc welding power source in accordance with claim 1, wherein a resistor is provided in parallel with the capacitor.

3. An arc welding power source in accordance with claim 2, wherein a switching means is provided in series to the resistor.

4. An arc welding power source comprising:

a welding transformer having a pair of star connection three phase secondary coils, a first welding output terminal made by connecting each neutral point of said pair of star connection three phase secondary coils, a pair of common connecting points, at each said pair of star connection three phase secondary coils, which connects secondary coils of said star connection three phase secondary coils at an end opposite to said neutral point, a plurality of rectifiers connected between the neutral point and said common connecting points in series to each of said secondary coils, an interphase reactor connected between said two common connecting points, a DC reactor connected to a middle point of said interphase reactor, a second welding output terminal connected to the DC reactor, a capacitor, having two ends, connected at one end to a connection between said interphase reactor and said DC reactor, and at the other end to said first welding output terminal, a pair of rectifiers connected between said neutral point and each of said common connecting points, and a means to control the welding output.

5. An arc welding power source in accordance with claim 4, wherein a resistor is provided in parallel with the capacitor.

6. An arc welding power source in accordance with claim 5, wherein a switching means is provided in series to the resistor.

* * * * *